(12) United States Patent
Brown

(10) Patent No.: US 11,079,035 B2
(45) Date of Patent: Aug. 3, 2021

(54) PRELOADED PIEZO ACTUATOR AND GAS VALVE EMPLOYING THE ACTUATOR

(71) Applicant: PIVOTAL SYSTEMS CORPORATION, Fremont, CA (US)

(72) Inventor: Timothy R. Brown, Prescott, AZ (US)

(73) Assignee: PIVOTAL SYSTEMS CORPORATION, Fremont, CA (US)

( * ) Notice: Subject to any disclaimer, the term of this patent is extended or adjusted under 35 U.S.C. 154(b) by 0 days.

(21) Appl. No.: 16/510,671

(22) Filed: Jul. 12, 2019

(65) Prior Publication Data

US 2021/0010608 A1 Jan. 14, 2021

(51) Int. Cl.
*F16K 31/00* (2006.01)
*F16K 27/02* (2006.01)
*F16K 7/00* (2006.01)

(52) U.S. Cl.
CPC ............ *F16K 31/004* (2013.01); *F16K 7/00* (2013.01); *F16K 27/0236* (2013.01)

(58) Field of Classification Search
CPC ...... F16K 7/00; F16K 27/0236; F16K 31/004; F16K 31/007; F16K 31/008
USPC .............................................. 251/11, 129.06
See application file for complete search history.

(56) References Cited

U.S. PATENT DOCUMENTS

| | | | | |
|---|---|---|---|---|
| 3,055,631 A | * | 9/1962 | Kippenhan | F16K 31/007 251/129.06 |
| 5,004,945 A | * | 4/1991 | Tomita | H01L 41/083 123/498 |
| 5,092,360 A | * | 3/1992 | Watanabe | F16K 31/007 137/487.5 |
| 5,100,100 A | * | 3/1992 | Benson | F16K 31/007 137/486 |
| 5,113,108 A | * | 5/1992 | Yamashita | H01L 41/053 310/328 |
| 5,171,648 A | * | 12/1992 | Beard | H01M 50/578 429/61 |

(Continued)

FOREIGN PATENT DOCUMENTS

WO     2014201032     12/2014

OTHER PUBLICATIONS

Transmittal of the International Search Report and Written Opinion of the International Searching Authority for PCT/US2020/041802, filed Jul. 13, 2020, dated Sep. 21, 2020, pp. 7.

*Primary Examiner* — Kevin F Murphy
*Assistant Examiner* — Jonathan J Waddy
(74) *Attorney, Agent, or Firm* — Womble Bond Dickinson (US) LLP; Joseph Bach, Esq.

(57) ABSTRACT

A valve arrangement for controlling gas flow. A gas block includes a gas inlet, a gas outlet, and a gas cavity fluidly connecting the gas inlet to the gas outlet. A diaphragm is configured for controlling gas flow between the gas inlet and the gas outlet. An actuator is configured to vary the position of the diaphragm so as to control the gas flow. The actuator comprises a tubular housing; a plunger positioned inside the housing and having an actuating extension extending outside of the housing and coupled to the diaphragm, the plunger configured to be slidable inside the housing; a piezoelectric body positioned inside the plunger; and a pre-loader applying force to the plunger so as to press the plunger against the piezoelectric body.

21 Claims, 3 Drawing Sheets

(56) References Cited

U.S. PATENT DOCUMENTS

| | | | | |
|---|---|---|---|---|
| 5,740,969 | A * | 4/1998 | Hoffmann | F02M 61/166 |
| | | | | 239/533.2 |
| 6,172,445 | B1 * | 1/2001 | Heinz | F02M 47/027 |
| | | | | 310/328 |
| 6,969,009 | B2 * | 11/2005 | Bachmaier | F02M 51/0603 |
| | | | | 239/102.2 |
| 9,855,591 | B2 * | 1/2018 | Schuerz | H01L 41/0536 |
| 2010/0127196 | A1 * | 5/2010 | Sawada | F16K 31/007 |
| | | | | 251/129.06 |
| 2010/0288239 | A1 | 11/2010 | Morris et al. | |
| 2014/0109995 | A1 * | 4/2014 | Moler | G05D 7/0635 |
| | | | | 137/487.5 |
| 2014/0290778 | A1 | 10/2014 | Yasuda et al. | |
| 2016/0245422 | A1 * | 8/2016 | Ishii | H01L 41/083 |
| 2017/0292622 | A1 | 10/2017 | Hayashi et al. | |
| 2018/0163886 | A1 * | 6/2018 | Shirey | H02N 2/043 |
| 2018/0240961 | A1 * | 8/2018 | Shigyou | F16K 31/007 |

\* cited by examiner

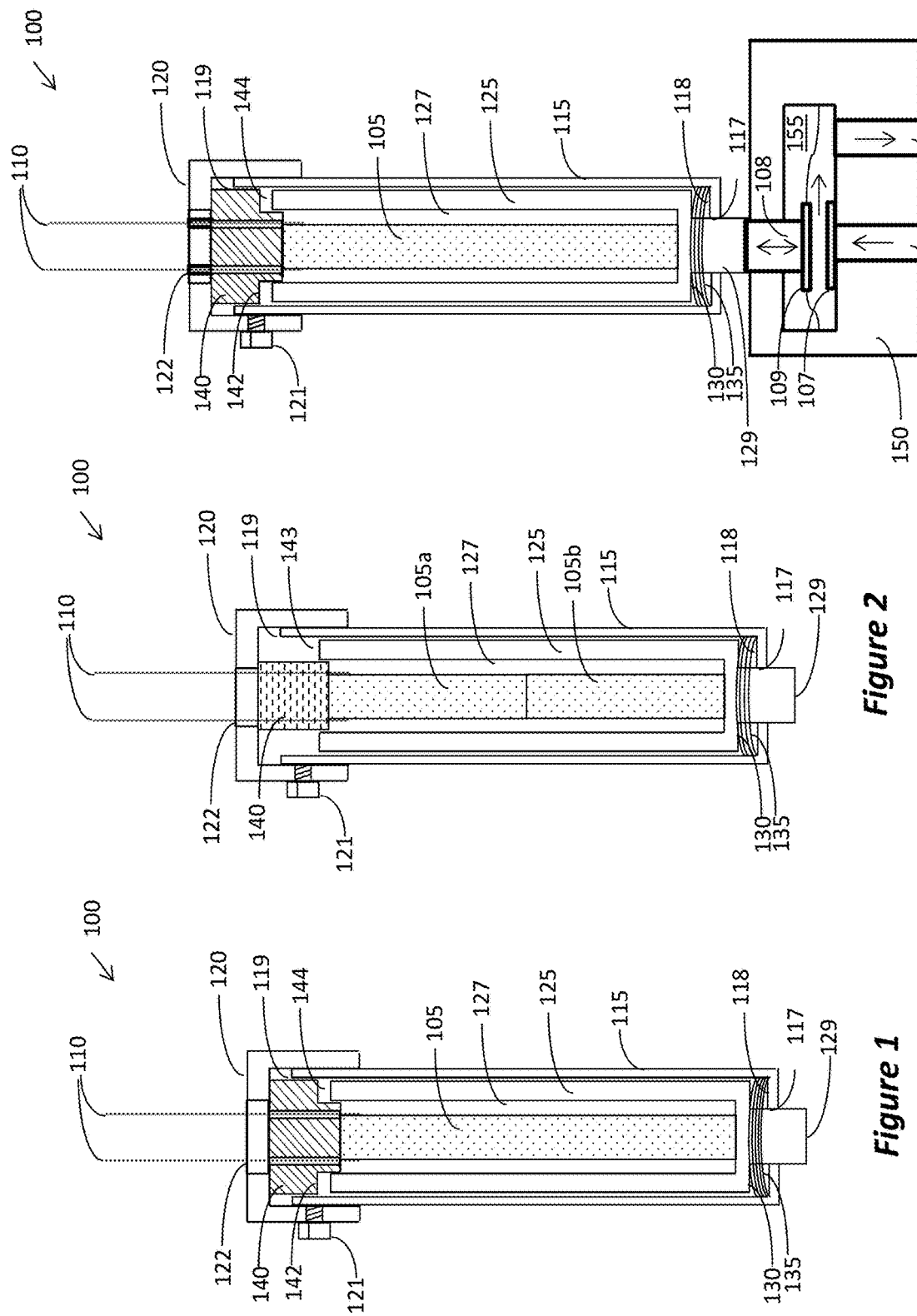

PRELOADED PIEZO ACTUATOR AND GAS VALVE EMPLOYING THE ACTUATOR

BACKGROUND

1. Field

This disclosure relates to piezoelectric actuators and a structure that transfers the expansion of the piezoelectric element, while protecting the element from the environment. The disclosure also relates to valves for controlling gas flow, especially valves employing piezoelectric actuators.

2. Related Art and Problem Being Solved

Actuators employing the expansion of piezoelectric elements upon application of voltage potential are known in the art. Arrangements for preloading the piezoelectric element are disclosed in, e.g., U.S. Pat. No. 7,859,169; however, in this and other publications no provisions are provided for protecting the piezoelectric element from the environment.

Accordingly, there is a need for a piezoelectric element arrangement that provide preloading and protection for the piezoelectric element. Also, arrangements are needed which can operate in high temperatures, e.g., up to 200° C. and provide protection from ambient moisture.

Gas flow can be controlled using valves. In situations where accurate control of very small amounts of gas flow is required, the amount of flow may be controlled using piezoelectric elements as the actuating device. Very accurate control of minute amount of gas flow is required, e.g., in semiconductor manufacturing equipment.

Gas flow valve utilizing piezoelectric elements were disclosed in, e.g., U.S. Pat. No. 5,881,767 and U.S. Publication 2018/0163886. While these valves may function properly in some environments, no provisions are disclosed for properly preloading the piezoelectric element, nor for protecting the piezoelectric element for operation in elevated temperatures and high moisture environments.

Accordingly, there is a need for a piezoelectric-based actuator which enables accurate control of gas flow, while enabling operation in elevated temperature, provide protection for the piezoelectric element, and resist damage from ambient moisture.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

An arrangement is provided for a piezoelectric actuator, wherein the arrangement provides preloading and protection of the piezoelectric element. The piezoelectric element is enclosed in a housing that protects the piezoelectric element, while also enabling transfer of the motion actuation outside the housing. In certain embodiments the housing is made of a material that minimizes thermal expansion in order to maintain constant preloading. In such embodiments the casing may be made of a nickel-iron alloy, also referred to as Invar, such as Invar 36®, available from Carpenter Technology Corporation of Philadelphia, Pa. In other embodiments the housing is made of a nickel cobalt alloy, such as Kovar, also available from Carpenter Technology Corporation. In yet other embodiments, the housing is made of Inovko, available from Nordt EPM of Roanoke, Va.

In some embodiments the preloading is achieved using spring washer, such as one or more Belleville washers. The spring washers are stacked and compressed between the housing and the piezoelectric element so as to preload the piezoelectric element. In some embodiments, the piezoelectric element is serially stacked elements, wherein a series of piezoelectric elements are stacked serially.

According to disclosed aspects, an actuator is provided comprising: an elongated tubular housing having a first end configured for accepting a cap and a second end having an actuating opening; a cap configured to securely attach to the first end; a plunger situated within the housing and configured to slide within the housing, the plunger having an actuating end comprising a shoulder and an actuating extension, wherein the actuating extension is sized to fit within the actuating opening and extend outside of the housing through the actuating opening; at least one piezoelectric element positioned within the plunger and abating interior wall of the actuating end; electrical leads attached to the at least one piezoelectric element; and, at least one preloading element positioned inside the housing and compressed between the second end and the shoulder.

According to other aspects, a valve arrangement for controlling gas flow is provided, comprising: a gas block having a gas inlet, a gas outlet, and a gas cavity fluidly connecting the gas inlet to the gas outlet; a diaphragm configured for controlling gas flow between the gas inlet and the gas outlet; an actuator configured to vary the position of the diaphragm so as to control the gas flow, the actuator comprising: a tubular housing; a plunger positioned inside the housing and having an actuating extension extending outside of the housing and coupled to the diaphragm, the plunger configured to be slidable inside the housing; a piezoelectric body positioned inside the plunger; and, a pre-loader applying force to the plunger so as to press the plunger against the piezoelectric body.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

One or more embodiments of the present invention are illustrated by way of example and not limitation in the figures of the accompanying drawings, in which like references indicate similar elements and in which:

FIG. 1 is a cross-section of an embodiment of the actuating device according to one embodiment;

FIG. 2 is a cross-section of an embodiment of the actuating device according to another embodiment;

FIG. 3 is a cross-section illustrating a gas valve incorporating the actuator of FIG. 1 or 2.

DETAILED DESCRIPTION

Figure 5:
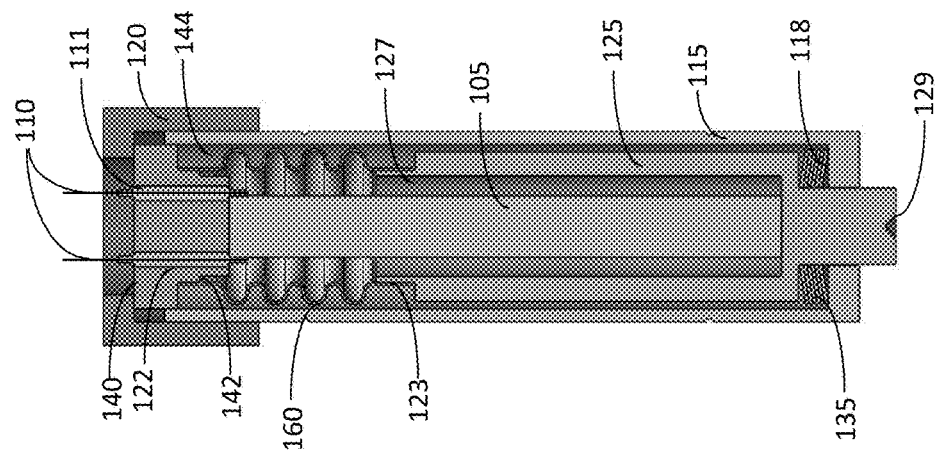
FIG. 5 is a cross-section illustrating an embodiment utilizing bellows to seal the piezoelectric element from the ambient environment.

Embodiments of the inventive actuator will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

The following embodiments disclose an arrangement for an actuator which utilizes a piezoelectric element that is preloaded and protected from the environment. As non-limiting examples of piezoelectric elements that can be use are the multilayer piezo actuators under the model number ANOX/8516 and B58004M4030A020, available from EPCOS, of Munich, Germany. These piezo units can operate stably at relatively high temperatures, but are recommended to be preloaded by over 100 N, with preferred loading of 730 N. Of course, other piezo elements may be used. A suitable piezo element is also disclosed in U.S. Pat. No. 9,425,378.

FIG. 1 illustrates a cross-section of an actuator 100. A generally tubular housing 115 has an actuating opening 117 at one end, and a cap opening 119 at the opposite end. The cap opening 119 may span the interior of the tubular housing, but the actuating opening 117 has a smaller diameter, thus defining a stop 118. A cap 120 is secured to the tubular housing by, e.g., thread. In the example of FIG. 1 the cap is also secured by a set screw 121. The cap includes passage 122 to allow passing of the electrical leads 110.

A plunger 125 is positioned inside the tubular housing 115 and is sized to have sufficient clearance from the interior wall of the tubular housing 115 so as to enable movement of the plunger 125 within the tubular housing 115. The plunger 125 is also generally tubular having interior cavity 127. The plunger 125 also includes an actuating extension 129 which is configured to fit within the actuating opening 117 of the tubular housing 115, and extend outside of the housing 115. As the extension 129 has a smaller diameter than the body of the plunger 125, it creates a shoulder 130.

A pre-loader 135 is positioned between the shoulder 130 and the stop 118, i.e., the interior wall of the actuating end of the tubular housing 115. In some embodiments the pre-loader may be in the form of spring washer. In some embodiments the pre-loader may be in the form of several Belleville washers stacked together serially. The pre-loader is compressed between the actuating end of the housing and the plunger.

A piezoelectric element 105 is positioned inside the cavity of the plunger. When the cap 120 is attached to the tubular body 115, it presses a stopper 140 against the piezo element 105, such that the stopper is compressed between the cap and the piezo element. The stopper 140 includes a recess 142 configured to provide a clearance 144 between the plunger 125 and the stopper 140, such that the stopper 140 does not press against the plunger 125. Namely, the plunger is free to slide into the clearance 144. On the other hand, since the pre-loader presses against the plunger 125, the plunger 125 transfers the load to the piezo element 105, thus preloading the piezo element.

The electrical leads 110 provide voltage potential to actuate the piezo element 105. The voltage range may be, e.g., from −10V to 180V. When the voltage is controlled to actuate the piezo element 105, the length of the piezo element 105 changes, thus changing the pressure applied to the plunger 125 in opposition to the force applied by the pre-loader, and thereby moving the plunger 125 in a sliding motion inside the tubular housing 115. Consequently, the extent to which the actuating extension 129 extends beyond the actuating opening 117 changes. This motion can be used to actuate devices, such as gas valves, as will be demonstrated in other embodiments below.

It should be appreciated that by having the piezo element positioned inside the plunger, which itself positioned inside the tubular housing, the piezo element is protected from the environment. Additionally, the stopper 140 may be made to isolate the interior of the tubular housing from the ambient environment, thus protecting the piezo element from moisture. Further, by having the piezo inside the plunger, the piezo is protected from chipping, as the piezo element is generally made of ceramic that's susceptible to chipping.

In certain embodiments, where the actuator may be employed at elevated temperatures, the housing and/or the plunger may be made of a material that minimizes thermal expansion in order to maintain constant preloading. In such embodiments the housing and/or the plunger may be made of a nickel-iron alloy, also referred to as Invar, such as Invar 36®, available from Carpenter Technology Corporation of Philadelphia, Pa. In other embodiments the housing and/or the plunger are made of a nickel cobalt alloy, such as Kovar, also available from Carpenter Technology Corporation. In yet other embodiments, the housing and/or the plunger are made of Inovko, available from Nordt EPM of Roanoke, Va.

FIG. 2 illustrates another embodiment of an actuator. The embodiment of FIG. 2 is similar to that of FIG. 1, except that several (here two) piezo elements, 105a and 105b are inserted serially into the plunger 125. If separate leads are provided to each of the piezo elements 105a and 105b, then it is possible to control the expansion of each piezo element separately or simultaneously.

FIG. 2 also illustrates a variation on the stopper 140, which may be employed in any of the other embodiments. Specifically, here the stopper 140 has a diameter that is smaller than the diameter of the plunger 125. Consequently, a clearance 143 is created between the plunger 125 and the cap 120, which enables the plunger 125 to slide within the housing 115. Also, this shape assists in centering the assembly as the pre-loading is applied and the cap is secured in place.

FIG. 3 illustrates an embodiment wherein the actuator of FIG. 2 is employed to control gas flow. A gas block 150 has gas flow cavity 155, a gas inlet 102, and a gas outlet 103. A seat 107 is provided at the entrance of the gas inlet into the cavity 155. A diaphragm 109 is configured to seal the seat 107 when it engages the seat 107. The diaphragm 109 is attached to rod 108, which engages the actuating extension 129. Consequently, as the piezo element extends and contracts due to applied voltage potential, the actuating extension 129 acts on the rod 108, which in turn moves the diaphragm in the direction of the double-headed arrow, so as to control the amount of flow of gas from the inlet 102 into the cavity 155, and thence to the gas outlet 103.

The embodiment of FIG. 3 illustrates a diaphragm that seals the gas inlet. However, the same arrangement can be made wherein the diaphragm seals the gas outlet, or both the gas inlet and gas outlet.

Figure 4:
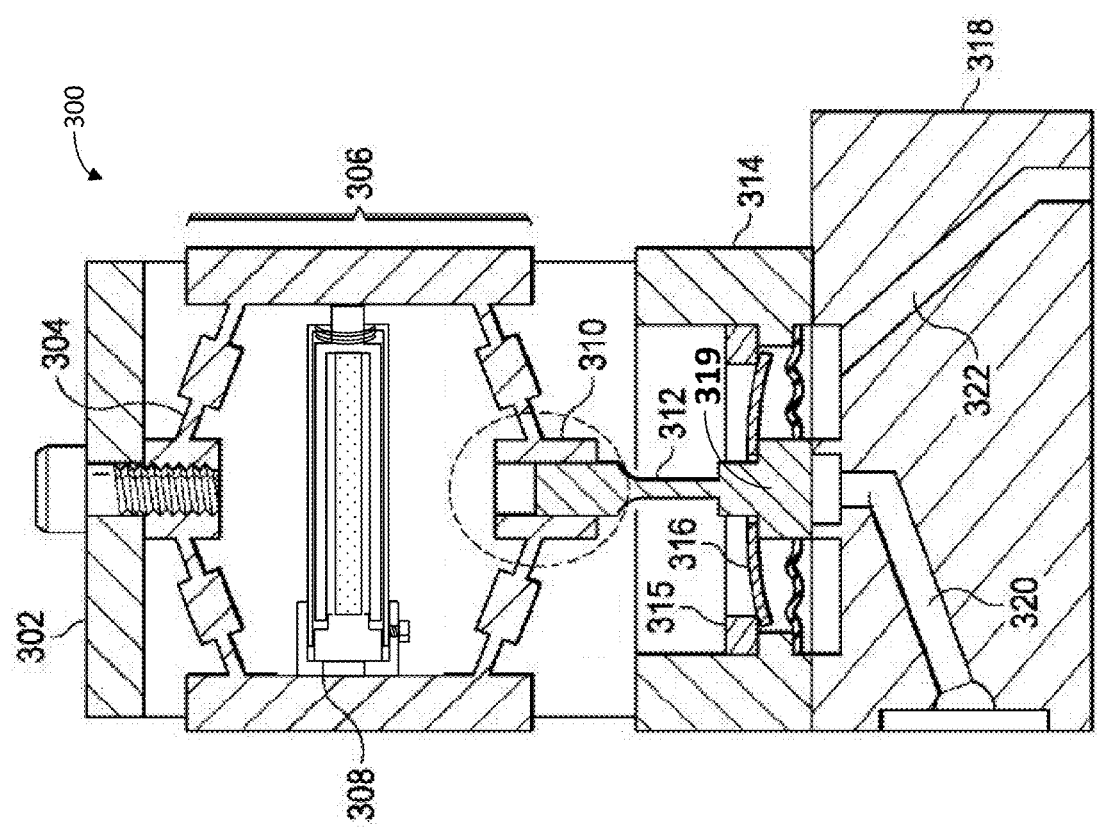
FIG. 4 is a cross-section illustrating another gas valve incorporating the actuator of FIG. 1 or 2.

FIG. 4 illustrates another embodiment, wherein the actuator of FIG. 1 is employed in the gas valve such as that disclosed in U.S. Patent Publication 2018/0163886. In the depicted embodiment, the valve 300 comprises an actuator frame 302, a flexural element 304, a mechanical amplifier 306, a piezo actuator 308 according to any of the above described embodiments, a rigid clamp 310, a bi-lateral flexure 312, a diaphragm housing 314, a preload spring 316, and a valve block 318.

The diaphragm housing 314 is attached to the valve block 318. The actuator frame 302 is attached to the outer part of the diaphragm housing 314. The bottom part of the mechanical amplifier 306 is mechanically attached to the diaphragm 319 via the bi-lateral flexure 312. The bi-lateral flexure 312 is capable of flexing or bending in any direction. The diaphragm 319 is pressed against the orifice of the gas inlet 320 by spring 316, thereby shutting off gas flow. Spring 316 is held in place by a preload spring clamp 315.

The piezo actuator 308 is located inside, and acts upon, the mechanical amplifier 306. In the depicted embodiment, the piezo actuator 308 is shown in its relaxed state, or its shortest length. As illustrated, in one embodiment, the mechanical amplifier 306 comprises top and bottom flexural elements 304 that provide a stroke multiplier that amplifies movement of the piezo actuator 308. For example, in one embodiment, the mechanical amplifier 306 is designed such that when the piezo actuator 308 expands, the expansion is magnified to an amplified movement in a direction orthogonal to the expansion of the piezo actuator 308. By applying a positive voltage to the piezo actuator 308, the mechanical amplifier 306 will retract and due to the rigid top mount, the diaphragm 319 will move away from the inlet orifice of valve block 318, allowing a controlled flow of gas from the inlet flow path 320 to the outlet flow path 322.

FIG. 5 illustrates another embodiment, suitable for any of the gas valves embodiments disclosed herein, especially when heightened protection for the piezoelectric element is desired, particularly protection from moisture and gaseous chemicals. As noted above, the placement of the piezoelectric element within the plunger provides mechanical protection. Also, the construction of the housing and/or the plunger using material that has low or no thermal expansion provides stability in elevated temperatures operations. Further, the cap 120 and stopper 140 isolate the piezoelectric element from the ambient. Additionally, in the embodiment of FIG. 5, the piezoelectric element is sealed from the environment exterior to the housing 115 by having bellows 160 attached at one end to the plunger 125 and at the other end to the stopper 140. In the embodiment of FIG. 5 the recess 142 is utilized to attach the bellows to the stopper 140. A similar recess 123 is provided on the plunger 125, and the bellows attach at the recess 123. In this manner, the piezoelectric element 105 is totally protected. In fact, the interior cavity 127 may be filled with inert gas, such as argon, to totally control the environment around the piezoelectric element.

In FIG. 5, as well as in any of the other embodiments, when it is desired to provide a hermetic seal for the electrical leads 110, the following procedure may be employed. First, the appropriate holes are drilled in the stopper 140. Then the leads 110 are suspended within the holes, avoiding any contact with the sidewall of the drilled holes. A glass frit is then filled into the holes, in the space between the sidewall of the holes and the leads. The assembly of the stopper 140, the frit, and the leads is then placed in an oven and fired to melt the frit and thereby produce a hermetic glass seal 111.

Figure 6:
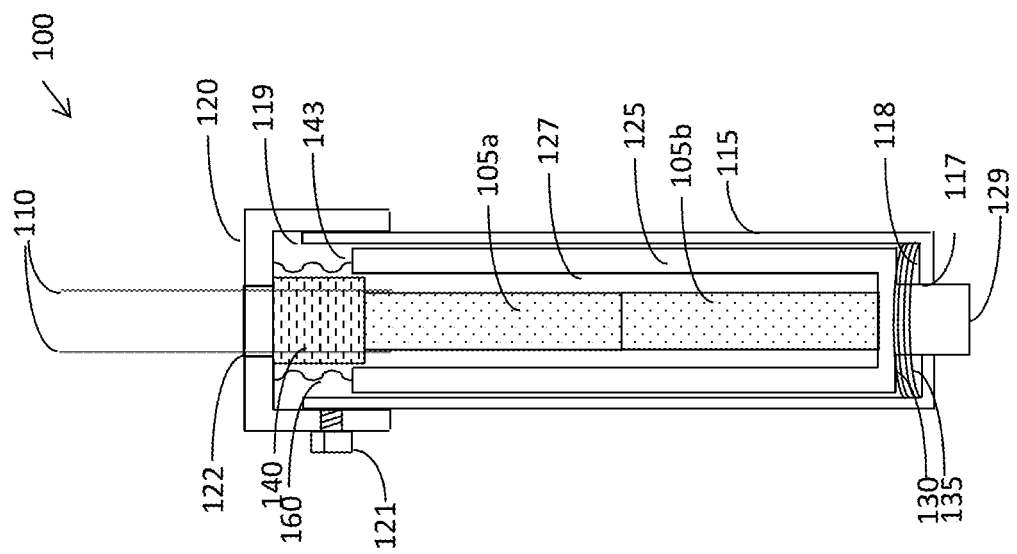
FIG. 6 is a cross-section illustrating another embodiment utilizing bellows to seal the piezoelectric element from the ambient environment.

FIG. 6 illustrates an embodiment wherein the bellows are sealed to the cap 120, rather than to the stopper 140. In such embodiment, the attachment of the cap 120 to the housing may be different than the threaded attachment of the embodiment of FIG. 1, since for the threading the cap need to rotate freely, which would be hindered by the bellows. Thus, either the sealing of the bellows to the cap needs to be rotatable, or the attachment of the cap to the housing should not require rotation. Also, in this particular example, the stopper 140 is enclosed within the bellows 160.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. An actuator comprising:
   an elongated tubular housing having a first end configured for accepting a cap and a second end having an actuating opening, the cap configured to securely attach to the first end;
   a plunger situated within the housing and configured to slide within the housing, the plunger having an actuating end comprising a shoulder and an actuating extension, wherein the actuating extension is sized to fit within the actuating opening and extend outside of the housing through the actuating opening;
   at least one piezoelectric element positioned within the plunger and abating abutting an interior wall of the actuating end of the plunger;
   a stopper compressed between the cap and the piezoelectric element, wherein the stopper comprises a recess forming a clearance between the stopper and the plunger, whereby the plunger is free to slide into the clearance.

2. A valve arrangement for controlling gas flow, comprising:
   a gas block having a gas inlet, a gas outlet, and a gas cavity fluidly connecting the gas inlet to the gas outlet;
   a diaphragm configured for controlling gas flow between the gas inlet and the gas outlet;
   an actuator configured to vary the position of the diaphragm so as to control the gas flow, the actuator comprising:
      a tubular housing;
      a plunger positioned inside the housing and having an actuating extension extending outside of the housing and coupled to the diaphragm, the plunger configured to be slidable inside the housing;
      a piezoelectric body positioned inside the plunger;

a cap fixedly attached to the housing and a stopper compressed between the cap and the piezoelectric body, wherein the stopper comprises a recess forming a clearance between the stopper and the plunger, whereby the plunger is free to slide into the clearance; and, a pre-loader applying force to the plunger so as to press the plunger against the piezoelectric body.

3. The valve arrangement of claim 2, wherein the pre-loader comprises a plurality of spring washers positioned between the housing and the plunger.

4. The valve arrangement of claim 2, wherein the piezoelectric body comprises a plurality of piezoelectric elements stacked serially.

5. The valve arrangement of claim 4, further comprising a plurality of electrical leads connected individually to each of the stacked piezoelectric elements.

6. The valve arrangement of claim 2, further comprising a mechanical amplifier.

7. The valve arrangement of claim 2, wherein at least one of the housing and the plunger comprises Invar, Inovco or Kovar.

8. The valve of claim 2, further comprising bellows sealing the piezoelectric body from the ambient environment.

9. A valve actuator arrangement comprising:
a tubular housing;
a plunger positioned inside the housing and having an actuating extension extending outside of the housing and coupled to a diaphragm, the plunger configured to be slidable inside the housing;
a piezoelectric body positioned inside the plunger and preloaded by over 700N;
a cap fixedly attached to the tubular housing and a stopper compressed between the cap and the piezoelectric body;
electrical leads attached to the piezoelectric body, the electrical leads hermetically sealed by glass frit inside respective holes in the stopper and thence passing through a passage in the cap.

10. The valve arrangement of claim 9, wherein the stopper comprises a recess forming a clearance between the stopper and the plunger, whereby the plunger is free to slide into the clearance.

11. An actuator comprising:
an elongated tubular housing having a first end configured for accepting a cap and a second end having an actuating opening, the cap configured to securely attach to the first end;
a plunger situated within the housing and configured to slide within the housing, the plunger having an actuating end comprising a shoulder and an actuating extension, wherein the actuating extension is sized to fit within the actuating opening and extend outside of the housing through the actuating opening;
at least one piezoelectric element positioned within the plunger and abutting an interior wall of the actuating end of the plunger;
a stopper positioned between the cap and the piezoelectric element;
electrical leads attached to the at least one piezoelectric element;
at least one preloading element positioned inside the housing and compressed between the second end of the housing and the shoulder;
bellows sealed at one end to the plunger and at a second end to the cap; and,
inert gas within the plunger and sealed by the bellows.

12. The actuator of claim 11, wherein the stopper is enclosed within the bellows.

13. An actuator comprising:
an elongated tubular housing having a first end configured for accepting a cap and a second end having an actuating opening, the cap configured to securely attach to the first end;
a plunger situated within the housing and configured to slide within the housing, the plunger having an actuating end comprising a shoulder and an actuating extension, wherein the actuating extension is sized to fit within the actuating opening and extend outside of the housing through the actuating opening;
at least one piezoelectric element positioned within the plunger and abutting an interior wall of the actuating end of the plunger;
a stopper positioned between the cap and the piezoelectric element, and bellows attached at one end to the plunger and at a second end to the stopper, and inert gas within the plunger and sealed by the bellows;
electrical leads attached to the at least one piezoelectric element; and,
at least one preloading element positioned inside the housing and compressed between the second end of the housing and the shoulder.

14. The actuator of claim 13, wherein the cap is configured to press the piezoelectric element against the preloading element when the cap is securely attached to the first end of the housing.

15. The actuator of claim 14, wherein the preloading element comprises at least one spring washer.

16. The actuator of claim 14, wherein the preloading element comprises at least one Belleville washer.

17. The actuator of claim 13, wherein the cap comprises a passageway for the electrical leads.

18. The actuator of claim 13, wherein the piezoelectric element comprises a plurality of piezoelectric transducers stacked serially.

19. The actuator of claim 13, wherein at least one of the housing and the plunger comprises Invar, Inovco or Kovar.

20. The actuator of claim 13, wherein the stopper comprises a recess sized to define a cavity between the stopper and the plunger.

21. The actuator of claim 13, wherein the at least one piezoelectric element comprises a plurality of piezoelectric elements stacked serially, and wherein the electrical leads comprises a plurality of leads independently attached to each of the plurality of piezoelectric elements.

* * * * *